F. H. TWEED.
AIR VALVE.
APPLICATION FILED AUG. 23, 1909.
1,192,020.  Patented July 25, 1916.
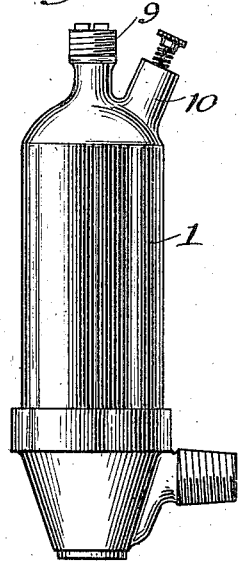
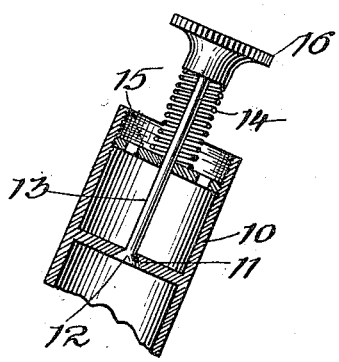
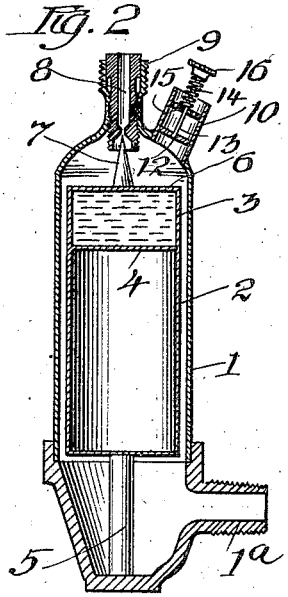
Witnesses:
Frank F. Blanchard
Edna K. Reynolds
Inventor:
Frederick H. Tweed.
By Parker Carter
Attorneys.

United States Patent Office.

FREDERICK H. TWEED, OF CHICAGO, ILLINOIS.

AIR-VALVE.

1,192,020. Specification of Letters Patent. Patented July 25, 1916.

Application filed August 23, 1909. Serial No. 514,086.

*To all whom it may concern:*

Be it known that I, FREDERICK H. TWEED, a citizen of the United States, residing at Chicago, in the county of Cook and State of Illinois, have invented a certain new and useful Improvement in Air-Valves, of which the following is a specification.

This invention relates to air valves, and has for its object to provide a new and improved valve of this description.

The invention is illustrated in the accompanying drawing, wherein—

Figure 1 is a view illustrating one form of valve embodying the invention; Fig. 2 is a longitudinal sectional view of the valve shown in Fig. 1; Fig. 3 is an enlarged sectional view of the controllable vent.

Like numerals refer to like parts throughout the several figures.

As shown in the drawing, the air valve is provided with a casing 1, having a screw threaded projection 1ª by means of which it is fastened to the radiator or other device in connection with which it is used, and contains a receptacle divided into two parts 2 and 3, separated by a partition 4. This receptacle is preferably movably mounted in the casing, and is supported at the bottom in any desired manner, as by means of the support 5. The ends of the receptacle are flexible. The portion 2 of the receptacle contains a gas, such, for example, as air under pressure, while the portion 3 contains an expansible liquid of any suitable kind. The part 3 of the receptacle is preferably located above the line of flotation of the receptacle. The upper end 6 of the receptacle is provided with a valve part 7 adapted to control an escape passageway 8 leading from the casing to the atmosphere. The escape passageway 8 as herein shown passes through the adjustable part 9, which may be moved to and from the valve part 7 to secure the desired adjustment. Under ordinary conditions of use the air valve is liable to become water bound by the water flowing therein and failing to flow out. In the present valve there is provided means for overcoming this difficulty, so that the valve can be easily and quickly relieved of water. The casing 1 is provided with a controllable air passage by means of which air can be let into or out of the casing above the water so as to change the relative pressure above and below the water, and permit it to flow out under the influence of gravity. As herein shown this vent or relieving device consists of a tube 10, projecting from the casing and provided with an opening 11. This opening is controlled by a valve or controllable part 12 connected with the stem 13. The valve 12 is forced against its seat so as to close the opening 11 by means of a spring or equivalent device 14, which, in the construction shown in the drawing, engages the part 15 and enlargement 16 on the end of the stem. The part 15 is provided with one or more openings which are out of alinement with the opening 11, so that if the valve is operated to open the opening 11 when the pressure in the valve is higher than the outside atmosphere, any water or other material which may be forced through the opening 11 will strike the part 15 and will not pass out of the opening or openings therein. The part 15 is also placed below the upper end of the tube 10, so that if any water should pass through the openings in the part 15, it will not flow out on the floor, but will be caught. If for example someone should hold the valve open until the space below the part 15 fills with water and the water begins to flow out of the opening in the part 15, this will be noted and the valve can be released so as to stop any further flow and before the water flows on to the carpet or floor. The parts are arranged so that when the enlargement 16 is pressed the stem 13 will be moved so as to move the valve 12 to uncover the opening 11. When the enlargement 16 is released the spring moves the parts back so as to close the opening 11. The strength of the spring may be adjusted so as to cause the valve 12 to open at any desired pressure, and this valve may be opened by hand or automatically when the pressure within the casing falls below a predetermined point.

The use and operation of my invention are as follows: The air valve herein shown is particularly adapted to be used in connection with steam radiators. When the steam is turned on to the radiator the air in the radiator is forced out through the casing 1 and the escape passageway 8. After the air has escaped the steam enters the casing 1 and strikes the part 2 of the receptacle, heating the expansible gas therein and causing the lower end to be pressed outwardly, thus lifting the receptacle so as to bring the valve part 7 toward its seat. This steam also heats the expansible liquid in the part 3 of the receptacle, which expands and moves the end 6 of the receptacle upwardly so as to force the valve part 7 against its seat and prevent the escape of the steam through the escape passageway 8. If, for example, water is forced into the casing 1, the receptacle will be caused to float when the water reaches a certain level, and the valve part 7 seated so as to prevent the water from flowing out through the escape passageway 8. When water enters the casing it is liable to stay therein, because of the comparatively small cross sectional area of the water and the fact that the pressure above the water is less than the pressure in the radiator. Under these conditions the valve becomes water bound and inoperative. If, now, the valve 12 is moved by pressing the enlargement 16, the pressure is equalized so that the water will flow back into the radiator and the valve again becomes operative.

It will thus be seen that anyone in the apartment in which the radiator is contained can easily and quickly manipulate the valve so as to permit the water to escape and the valve can thus be easily kept in an operative condition. It will further be seen that as soon as the stem 13 is released the valve 12 will automatically move to its closed position, and that therefore this relief device may be operated at any and all times without injury to the valve, and without displacing any of the parts so as to cause it to work improperly.

It will be noted that since the receptacle in the valve which consists of the parts 2 and 3 is almost as large as the inner diameter of the casing 1, the water which may be in the valve tends to stay in this space and to hold the valve up in its closed position. In many cases capillary attraction alone is sufficient for this purpose, but by means of this valve the water can be discharged and the entire valve be made to operate properly.

I claim:

An air valve for radiators comprising a casing provided with an escape passageway leading therefrom, a valve controlling said passageway, a tube connected with said casing, a portion extending across said tube and provided with an opening, a valve controlling said opening, a piece above said portion extending across the tube at a distance below its upper end and through which the stem of the valve passes, said latter piece provided with an opening out of alinement with the valve opening.

FREDERICK H. TWEED.

Witness:
EDNA K. REYNOLDS,
MINNIE M. LINDENAU.